Figure 1:
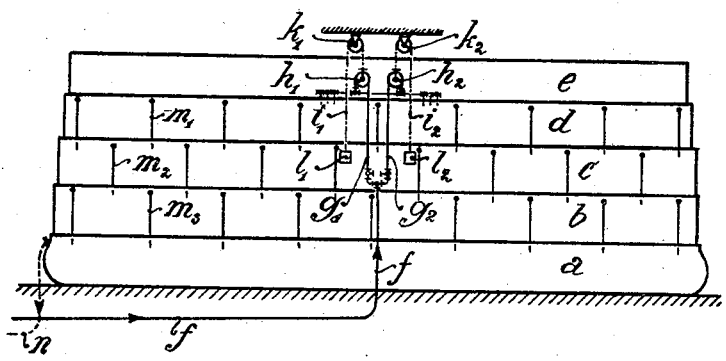
Figure 1:
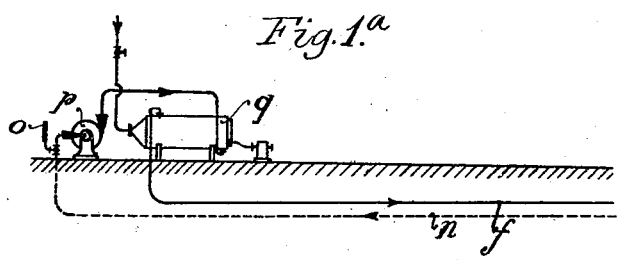

L. KNORR.
HEATING APPARATUS FOR GAS HOLDERS.
APPLICATION FILED MAR. 15, 1910.

968,167.

Patented Aug. 23, 1910.
2 SHEETS—SHEET 1.

Fig. 1.a

Witnesses:
Corinne Myers.
Thomas Donnellan

Inventor:
Leonhard Knorr
by L. K. John,
Attorney.

L. KNORR.
HEATING APPARATUS FOR GAS HOLDERS.
APPLICATION FILED MAR. 15, 1910.
968,167.
Patented Aug. 23, 1910.
2 SHEETS—SHEET 2.
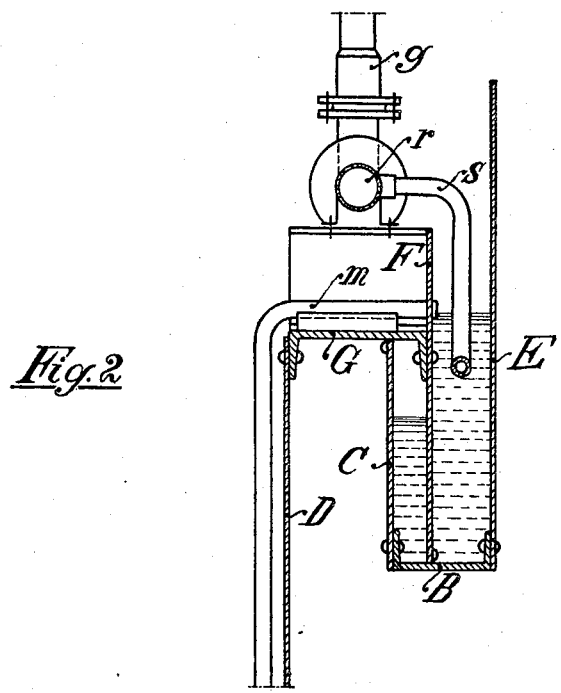
Fig. 2
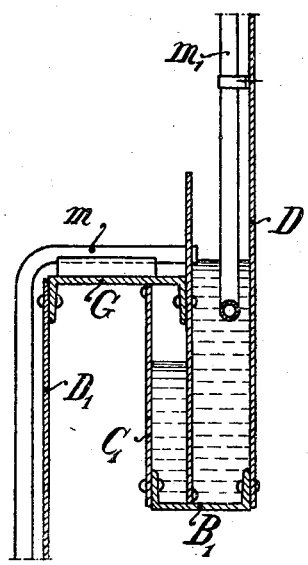
Witnesses:
Corinne Myers,
Thomas Donnellan.
Inventor:
Leonhard Knorr,
by L. K. Böhm,
Attorney.

UNITED STATES PATENT OFFICE.

LEONHARD KNORR, OF NUREMBERG, GERMANY, ASSIGNOR TO MASCHINENFABRIK AUGSBURG-NÜRNBERG A. G., OF NUREMBERG, GERMANY.

HEATING APPARATUS FOR GAS-HOLDERS.

968,167. Specification of Letters Patent. Patented Aug. 23, 1910.

Application filed March 15, 1910. Serial No. 549,511.

*To all whom it may concern:*

Be it known that I, LEONHARD KNORR, a subject of the Emperor of Germany, and residing at 37 Maxfeldstrasse, Nuremberg, Germany, have invented certain new and useful Improvements in Heating Apparatus for Gas-Holders, of which the following is a specification.

In connection with gas-holders it is necessary to provide heating apparatus for the purpose of preventing the sealing liquid in the sealing troughs from freezing. Such apparatus have consisted hitherto of steam supply ducts leading directly into the sealing liquid into which the steam is delivered by ejectors and by becoming mixed with the sealing liquid, heats the latter. Such apparatus have the following drawbacks which the present invention has for its object to obviate:—

1. By supplying steam so that it mixes with and becomes condensed in the sealing liquid, the quantity of sealing liquid in the several sealing troughs is continually increased, and, since the excess quantity cannot otherwise flow away, the said excess in each trough will finally overflow over the edge of the trough and run down along the sides of the gas-holder whereby it is very liable to freeze and thus cause disturbances in the working.

2. Separate flexible steam supply pipes are required for each sealing trough. Since these flexible steam pipes have to move with the several telescopic gas-holder sections, they must be led over guide pulleys or jockey pulleys. This causes a rapid wear of the flexible pipes, and, since these are costly, the entire installation is rendered comparatively expensive. In the improved apparatus only one such supply pipe leading to the topmost sealing trough is required. This lessens the cost of the installation and increases its certainty in working.

3. The high temperature of the steam supplied to the flexible pipes, damages these very much, and necessitates their frequent renewal. In the improved apparatus, warm water only may be supplied to the flexible pipes so that their "life" is greatly lengthened.

4. The existing steam heating apparatus does not furnish a certain indication of the degree of temperature attained by the sealing liquid in the several sealing troughs. There is therefore no certainty that the sealing liquid is being heated too much or too little. The improved apparatus provides a continual indication of the temperature of the sealing liquid, and thus allows of controlling said temperature by regulating the heat supply accordingly.

The present invention consists substantially in supplying the heating liquid only to the topmost sealing trough, and in providing overflow pipes by which the heated sealing liquid in the said topmost sealing trough overflows in succession into the lower sealing troughs and finally into the bottom trough. From the latter the said liquid may be returned to the heating device and thence be pumped back into the topmost sealing trough. The whole of the liquid is thus caused to circulate in a closed cycle in which the heating device is included.

A thermometer introduced at a suitable point of the cycle, for instance, immediately in front of the heating device, that is, where the cooled liquid is discharged from the bottom trough, will give a continual indication from which the heating can be increased or diminished according to the temperature indicated.

In the accompanying diagrammatic drawings, Figure 1 is an elevation of part of a gas-holder embodying one form of this invention. Fig. 1$^a$ is a detail view, and Fig. 2, drawn to a larger scale, is a vertical section partly in elevation of part of the topmost sealing trough and part of the next trough below, illustrating the arrangement of the supply of heating liquid to the former and its overflow thence into the latter trough.

The gas-holder shown in Fig. 1, comprises the bottom trough $a$ and four telescoping annular sections $b$, $c$, $d$, $e$, the latter carrying the roof (not shown).

The heating liquid is supplied by the pipe $f$. To this pipe are connected two flexible pipes $g_1$ and $g_2$ which are led over two pulleys $h_1$, $h_2$, into the topmost sealing trough that connects the two gasholder sections $d$ and $e$. The pulleys $h_1$, $h_2$, are suspended from tensile members $i_1$, $i_2$, which pass over pulleys $k_1$, $k_2$, attached to the gas-holder framing (not shown), and which carry weights $l_1$, $l_2$, at their other ends so that the flexible pipes $g_1$, $g_2$, are kept continually taut. The excess of the sealing liquid overflows from the topmost sealing trough through the overflow pipe $m_1$, into the next lower sealing trough, and thence similarly through the overflow pipes $m_2$, $m_3$, until it reaches the bottom trough $a$. From the bottom trough $a$ the liquid is drawn through the pipe $n$ by the pump $p$ and forced thence through the heating device $q$ and the pipe $f$ back up into the topmost trough.

$o$ is a thermometer which is inserted at any convenient point in the pipe $n$, preferably as shown, immediately in front of the heating device; it indicates the temperature of the circulating liquid at that point, and thus enables any requisite regulation to be effected.

The overflow pipes $m_1$, $m_2$, &c., may be rigid and fastened to their respective telescoping sections. By this means the flexible pipes provided hitherto for each sealing trough which are expensive and liable to rapid wear, are dispensed with.

In Fig. 2, E is the side of the topmost telescoping section of the gas-holder. The topmost sealing trough is formed by the annular U-member B riveted to the side E, and by the ring C. The next lower telescoping section D carries at its upper end an annular U-member G to which a ring F is riveted that dips into the sealing liquid. $r$ is a circular pipe carried by an upper extension of the ring F; it receives the heating liquid from a flexible pipe $g$ and delivers said liquid through a number of pipes $s$ distributed over the entire circumference of the sealing trough, into the latter.

If the sealing liquid should rise beyond a determined level, it will overflow through the overflow pipes $m_1$, into the next lower sealing trough whence it will be conveyed through further overflow pipes $m_2$ into the next lower sealing trough, and so on, as shown in Fig. 1.

The power required to work the improved apparatus is not greater than that consumed in operating the ejectors hitherto employed in delivering steam into the sealing troughs, because it has been necessary to employ steam having a pressure of several atmospheres for that purpose. The said steam pressure suffices to drive the pump $p$, and the exhaust steam can be utilized in the heating device $q$ for heating the sealing liquid.

If desired, the contents of the topmost sealing trough may be heated by steam in the manner hitherto practiced, and the excess of liquid may be conveyed away according to the present invention by means of overflow pipes. In such an arrangement the pipe $n$ for returning the liquid from the bottom trough to the heating device, and also the latter and the pump, may be dispensed with.

Having now described my invention what I claim as new and desire to secure by Letters Patent is:—

1. In a gas-holder heating apparatus, the combination with a gas-holder having a plurality of sealing troughs, of a duct delivering heating fluid into an upper sealing trough, an overflow pipe for discharging sealing liquid from said sealing trough into a lower sealing trough, and an overflow pipe for discharging sealing liquid from said lower sealing trough into the sealing bottom of the gas-holder as set forth.

2. In a gas-holder heating apparatus, the combination with a gas-holder having a plurality of sealing troughs, of a duct for delivering heating fluid into the topmost sealing trough, a plurality of overflow pipes for discharging sealing liquid from said topmost sealing trough into the next lower sealing trough, and so on in succession from each sealing trough into the sealing trough immediately below it, and an overflow pipe for discharging sealing liquid from the lowest sealing trough into the sealing bottom of the gas-holder, as set forth.

3. In a gas-holder heating apparatus, the combination with a gas-holder having a plurality of sealing troughs, of a supply duct for delivering heating fluid into an upper sealing trough, an overflow pipe for discharging sealing liquid from said upper sealing trough into the next lower sealing trough, and so on in succession throughout said sealing troughs, a heating device connected to said supply duct, and a connecting duct between the lowest sealing trough and said heating device, whereby the excess of sealing liquid produced by the delivery of heating fluid into said upper sealing trough is conveyed by said overflow pipes from each sealing trough to the next lower sealing trough and so on until the bottom trough is reached whence the overflow of sealing liquid passes into the heating device, for reheating and redelivery into said upper sealing trough, as set forth.

4. In a gas-holder heating apparatus, the combination with a gas-holder having a plurality of sealing troughs, of a supply duct for delivering heated sealing liquid into an upper sealing trough, a plurality of overflow pipes for discharging sealing liquid from said upper trough into a lower trough, and so on in succession from each sealing trough into the next lower one, a heating device for heating sealing liquid and delivering same into said supply pipe, and a pipe connecting the lowest sealing trough with said heating device, whereby the heated sealing liquid delivered into the upper sealing trough overflows successively from each sealing trough into the next lower sealing trough, and finally overflowing into the lowest sealing trough whence it flows into said heating device wherein it is reheated for redelivery into said upper sealing trough thereby establishing a circulation of heated sealing liquid throughout the system, as set forth.

5. In gas-holder heating apparatus, the combination with a gas-holder having a plurality of sealing troughs, of a duct for delivering heated sealing liquid into an upper sealing trough, and a plurality of rigid pipes, each fixed to its respective gas-holder section, for discharging sealing liquid from each sealing trough into the next lower sealing trough, as set forth.

6. In gas-holder heating apparatus, the combination with a gas-holder having a plurality of sealing troughs, of a duct for delivering heated sealing liquid into an upper sealing trough, a plurality of pipes for discharging sealing liquid from each sealing trough into the next lower sealing trough, a heating device for heating sealing liquid and delivering same into said supply duct, a connecting pipe between the lowest sealing trough and said heating device, and a thermometer included in said connecting pipe, as set forth.

In testimony whereof I have signed my name to this specification in the presence of two subscribing witnesses.

LEONHARD KNORR.

Witnesses:
  OSCAR BOCK,
  HANS SCHODER.